3,476,740
PROCESS FOR TREATING SULFONATED LIGNIN-CONTAINING MATERIAL AND PRODUCT THEREOF
Aaron E. Markham and Kenneth A. E. Blackmore, Bellingham, Wash., assignors to Georgia-Pacific Corporation, Portland, Oreg., a corporation of Georgia
No Drawing. Filed Nov. 14, 1966, Ser. No. 593,653
Int. Cl. C07g *1/00;* C04b *11/14*
U.S. Cl. 260—124                    20 Claims

ABSTRACT OF THE DISCLOSURE

A water-soluble sulfonated lignin-containing material of enhanced dispersing properties prepared by oxidizing sulfonated lignin-containing material and heating the product in a dry form to a temperature of at least 200° C.

---

This invention relates to a process for treating sulfonated lignin-containing materials, and to the product thereof. More particularly, it relates to a process of heat treating the sulfonated lignin-containing materials in a dry form at a temperature above 200° C. and the product thereof.

Sulfonated lignin-containing materials and salts thereof, comprising mainly sulfonated products of lignin or lignosulfonates are essentially the sulfonated non-cellulosic portion of a lignocellulosic material. Lignin is a polymeric substance of substituted aromatics found in plant and vegetable tissue associated with cellulose and other plant constituents. While there is some variation in the chemical structure of the lignin and of other constituents found in the plant, depending upon the type of the plant, place where the plant is grown, and also upon the method used in recovery or isolation of the particular constituents from the plant tissue, the basic structure and properties of these materials upon sulfonation are similar and form the well known group of materials referred to herein at times as "lignosulfonate product."

One of the main sources of the lignosulfonate product or sulfonated lignin-containing material is the residual pulping liquors obtained in the pulp and paper industry where lignocellulosic materials such as wood, straw, corn stalks, bagasse and the like are processed to recover the cellulose or pulp. In the sulfite pulping process, the lignocellulosic material is digested with a bisulfite or sulfite to obtain a sulfonated residual pulping liquor commonly referred to as "spent sulfite liquor" containing the sulfonated lignin products. In other pulping processes, the residual pulping liquor as obtained from the process may not be a sulfonated product. However, the residual liquor or products containing the lignin portion of the lignocellulosic materials from the sulfite or other processes may be treated by various known methods to sufonate the products to the degree desired. These materials have a number of industrial and commercial uses which include use as surface-active agents, as dispersing agents, and as additives to oil drilling fluids where they variously perform such functions as thinning, reduction of fluid loss, emulsification and the like. They are handled as solutions or in a substantially dry state as obtained by evaporation and drying of the sulfonated residual pulping liquors.

It is an object of the present invention to provide sulfonated lignin-containing materials having enhanced properties as surface-active agents, dispersing agents, or well drilling fluid additives and the like. Another object is to provide a process for their preparation. A further object is to provide a process for heat treating sulfonated lignin-containing materials in a relatively dry state at temperatures above the normal ignition temperature of the product. Other objects of the invention will become apparent as the description thereof proceeds.

Generally speaking, in accordance with an illustrative embodiment of our invention, we subject sulfonated lignin-containing materials to a mild oxidation, such as halogenation, or reaction with other oxidizing agents and then heat the so-treated product in a substantially dry state or as a free flowing powder or granular solid at a temperature above 200° C. to obtain the heat treated product without degradation or charring. By so pretreating the sulfonated lignin-containing material, no difficulties are encountered in heating of the product in a solid state to the high temperatures without degradation or ignition. Improved products are obtained which may be used as dispersing agents, oil field drilling fluid additives, and for other uses.

The exact effect of pretreating the sulfonated lignin-containing material and heating it to the high temperature in a dry state is not known. It is speculated that by mild oxidation, a certain modification of the product is obtained which then, upon heating, results in driving off certain constituents without degrading the product to the extent that it is totally decomposed as by desulfonation, charring or becoming insoluble. In effecting the preliminary oxidation and the heating in a dry state, some constituents are vaporized and driven off.

Generally the untreated product may ignite or undergo a spontaneous degradation when heated in dry form. The particular temperature at which the ignition or degradation takes place varies somewhat with the particular lignosulfonate product, rate of heating, and also the time the product is at the high temperature. For example, the untreated powder may ignite immediately upon heating rapidly to a temperature of 220° C. to 230° C. but may not ignite when heated slowly or preheated for some time at a temperature below 180° C. The sulfonated lignin-containing material generally obtained contains non-ligneous constituents such as sugars, tannins, and other materials extracted from the lignocellulosic material which, when heated under non-aqueous conditions, may contribute to the ignition of the product. The ignition or reaction effected at these temperatures may result from the reaction of sulfonated lignin with constituents present in the product so that the presence or absence of a particular atmosphere is not necessary to obtain this self-ignition. Some processes in which the sulfonated lignin-containing materials have been heated at temperatures above 200° C. in the dry state involve intermixing the dry sulfonated lignin-containing products with caustic or lime or other chemicals so that upon heating at temperatures above 200° C., a degraded reaction product with the alkali is obtained.

One of the most convient methods of pretreatment is the halogenation of the sulfonated lignin-containing material prior to heating. However, other oxidizing agents having an oxidation potential in an acid medium in the range of 0.8 to about 1.5 such as for example hydrogen peroxide, nitric acid and persulfates may be used. The reaction with most oxidizing agents is rapid and the oxidation may be effected in a matter of a few minutes. Generally, it is most convenient to obtain the sulfonated lignin-containing material as a spray dried product and subject the product to oxidation in a fluidized form. It is preferred to use a gaseous agent such as chlorine and bromine which may be diluted with a carrier gas such as air, nitrogen, argon and the like, and carry out the oxidation in a fluid bed type reactor. The addition of the carrier gas such as air, nitrogen, argon and the like my serve as a fluidizing gas and may also be used to dilute the oxidizing agent to reduce the rate of reaction in the event the reaction is too vigorous.

In effecting the pretreatment of the lignosulfonate product with, for example, nitric acid instead of a gaseous oxidizing agent, the sulfonated lignin-containing material is intermixed with a nitric acid solution partially neutralized and then dried.

In carrying out the heat treatment of the lignosulfonates a temperature in the range of about 200° C. to 330° C. preferably in the range of 230° C. to 330° C. is generally used. The time for which the material must be maintained at a temperature in the above range to obtain the enhanced properties varies in a general fashion inversely with the temperature chosen. At temperatures in the lower part of the range a heating time of about one to three hours or even more may be employed; whereas, at the highest preferred temperature, the time required just to heat the product to that temperature may be sufficient. After the heat treatment as described, the so-treated material may be immediately used for whatever purpose desired or, as is more usual, it may be cooled to approximately room temperature and bagged or placed in barrels for later use.

Neither the degree of purity of the sulfonated lignin-containing material nor its source are critical. The products which are obtained from delignification of lignin-cellulosic materials by the sulfate or bisulfite process where the lignin is sulfonated may be used as obtained. Also, products obtained from other processes such as the alkaline pulping processes in which the lignin is not sulfonated may be used after sulfonation by the various known processes. Likewise, hydrolysis lignin obtained by hydrolysis of ligocellulosic materials in preparation of wood sugars and "hydrotropic lignin" derived from the hydrotropic pulping process may also be sulfonated and used. The lignosulfonote products obtained may be processed prior to the heat treatment such as by removing the sulfur dioxide and other hydrolyzable products by stripping and such. Also, the product may be further sulfonated, heated, given a mild alkaline or acid or other treatment. While these treatments will change the properties of the product somewhat, the treated products still retain the same basic properties and characteristics unless the treatments are carried out to the extent to insolubilize the product or destroy the basic lignin structure. The product may also be subjected to a process such as fermentation, dialysis or fractionation to separate and remove certain non-ligneous constituents from the sulfonated lignin products or to obtain a particular fraction of sulfonated ligins having a given molecular weight range. Most of the processing and recovery may be carried out prior to or after the heat treatment in a dry state. Generally, it is preferred to effect the separation prior to the heating since the product obtained from the delignification process is in solution and the separations may be thus more easily effected from this solution. Also, the ligno-sulfonate product is usually pretreated and heat treated at the high temperatures in a dry form as salt of calcium, sodium, magnesium, ammonium, or in the salt form from which it is obtained from the delignification process. Salts of other metals such as chromium, iron, copper, aluminum, and mixtures thereof may also be used if desired. In the formation of the particular metal salts, the known processes of reacting a compound of the metals with lignosulfonate may be used. Water-soluble metal salts and compounds such as the sulfates, nitrates and organic salts such as acetates may be used. The sulfate salts are preferred in a calcium base sulfite liquor is employed. Upon intermixing the heat treated material with an aqueous solution of a particular metal sulfate, the calcium precipitates as calcium sulfate, being displaced by the metal which reacts with the sulfonated lignins to form a simple salt or complex. In effecting the reaction with a particular metal salt, the heat treated lignosulfonate product may be simply intermixed in solution with a water-soluble metal compound. The reaction may be carried out at room temperature or at an elevated temperature for a short period of time of from about 5 to 10 minutets or as long as 24 hours or longer. Usually the mixture is heated in the range of 70° C., to 100° C., for from about ½ to two hours. The interaction is generall effected at a pH below 6, preferably in the range of 2 to 4, although a PH of as low as about 1 may also be employed.

When the water-soluble compounds of metals such as iron, chromium, aluminum, and copper are intermixed with the lignosulfonate product, the actual mechanism of the interaction between the metal and the lignosulfonate product obtained is not definitely known. There are indications that some type of a complex salt may be formed differing somewhat from a simple salt. Thus, the term "lingosulfonate salt" as used herein means the metal lignosulfonate reaction product regardless of the method of interaction of the metal with the sulfonated lignin products.

In the oxidation of the sulfonated lignin-containing material with a gaseous oxidizing agent, the lignosulfonate product may be oxidized as a suspension in a liquid medium as well as in a fluidized bed. We greatly prefer, however, to halogenate the material after it has been dried or reduced to a pulverulent state such as obtained by spray drying.

Sulfonated lignin-containing materials in dry form are hygroscopic so that in a solid dry state the product contains a small amount of moisture which can be up to about 8 weight percent but usually is in the range of one to four percent. Thus, the term "dry form," as used herein with respect to the ligno-sulfonate product, does not mean an anhydrous product, but rather a product in solid form which may contain a small amount of moisture. Sulfonated lignin-containing materials which have been spray dried generally contain a proportion of moisture which is suitable for our purpose.

While the lignosulfonate product to be treated can be tumbled in a drum in the process of halogenation, we find it best to use a powdered lignosulfonate product and to blow the halogen through a fluidized bed of the powder. Ordinarily, in such an installation, the halogen gas in a preferred carrier of air may be recirculated through the fluidized bed. Chlorine is the halogen preferred.

We generally work with a considerable excess of chlorine available to the lignosulfonate product. The total amount of chlorine taken up, reacted and adsorbed by the sulfonated lignin-containing material may be 0.2 to about 5 weight percent when the halogenation is carried out with a dry solid. The halogenation initiated at room temperature may be sufficiently completed in as short a time as about one minute, but generally a contact time of 10 minutes to one hour is utilized. Further contact of the lignosulfonate product with the gas for a longer period of time, for example, two hours, apparently has no adverse effect. Very little additional halogen is taken up by the product after the initial contact with the required amount of chlorine. If desired, the halogenating temperature may be an elevated one, although it is generally preferred to carry out the halogenation without external heating. Normally, subsequent to halogenation, we drive off the unreacted chlorine from the mass of the halogenated product by simply purging with air.

The second step of our process comprises the heating of the pretreated sulfonated lignin-containing material at a temperature in the range of 220° C. to 330° C. A temperature as low as 200° C. may be used for treating the lignosulfonate product to obtain enhanced properties. However, exceedingly long heating time is required. Even with this long heating time, the final product generally obtained, while improved, is markedly inferior to a product which has been treated at a temperature of 220° C. and above. Likewise, temperatures up to about 330° C. may be used but the time at the temperatures above 270° C. is very short and careful control is necessary to keep from charring or completely insolubilizing the product. The preferred temperature is from about 230° C. to 270° C. for most of the lignosulfonate products except the ammonium base or salts of the sulfonated lignin-containing materials or products. For these ammonium lignosulfonate products, the preferred temperature is about 220° C.

The heating step may be carried out either in an inert atmosphere, such as for example, argon, nitrogen, carbon dioxide or flue gas, or in an atmosphere of air. We have found however that air is as good as an inert gas and may even provide a better product. Consequently, we prefer air. The oxidized powdered lignosulfonate product may be heat treated, using any of the methods ordinarily available in the chemical engineering art, such as carrying a thin layer through a heated atmosphere on a conveyor belt, doing the same by means of a trough and screw feed conveyor, tumbling in a rotary kiln, heating in a tray dryer apparatus maintained at the elevated temperature and the like. Again, however, we have found it best and also most convenient to heat the pretreated sulfonated lignin-containing material and keep it heated for the period of time necessary by means of heated air introduced in such a fashion as to form a fluidized bed. If desired, the same apparatus may be used as in the halogenation steps described hereinabove.

As mentioned, the optimum heating time varies with the temperature selected within the range that we have found operative and namely from a heating time of about one to three hours at 220° C. to a heating time of a minute or so at about 270° C. Generally a heating time of from ¼ to one hour is employed. Upon heating of the treated lignosulfonate product, the pH of the product as measured by the pH of one percent aqueous solution generally changes. For most of the products, the pH will increase upon heating, while for others such as the ammonium base lignosulfonate product, the pH may decrease possibly due to the loss of the base. The product is generally heated at the operative temperature range for a sufficient length of time to obtain a significant change in the pH, i.e. at least 0.2 or 0.3 of a pH unit. As the product is heated beyond a certain point, it generally becomes insoluble in water with continued heating. The optimum product is generally obtained when the heating is carried out to a point such that a small portion, for example, 5 to 10% is insoluble, although at times it may be desirable to have a product which is substantially all soluble or insoluble to a much larger extent, for example, up to 50% of the material. Excessive heating will result in charring the product which destroys its effectiveness for most uses.

The material so produced is a dry powder relatively non-hygroscopic and stable in storage. It may be packed in drums or in bags and held for use as needed. For use it is generally added directly to the system to be treated either as a powder or first dissolved in water.

As has been mentioned, products made in accordance with the invention show greatly enhanced dispersing ability for many types of dispersions, especially in aqueous suspension. Thus, for example, if a small amount is incorporated in a plaster of Paris slurry or in a Portland cement mix, reduction in the viscosity of the slurry takes place and this is appreciably enhanced over the use of an equal weight of untreated lignosulfonate.

Again, the materials treated in accordance with the invention are superior drilling mud additives. In this usage they perform a number of functions simultaneously including dispersion and reduction of the filtration loss of the drilling mud, resulting possibly in part from increased dispersion and in part from a specific plugging action in the microscopic or even submicroscopic channels in the filter cake laid down by the drilling mud upon filtration.

Some examples showing these effects and how the material in accordance with the invention may typically be used follow.

EXAMPLE I

The sulfonated lignin-containing material used was a fermented steam-stripped calcium base spent sulfite liquor. About 700 grams of the spray-dried spent sulfite liquor (SSL) solids from pulping western hemlock and other western softwoods were chlorinated in a fluidized bed by passing a gas comprising 10% chlorine and 90% air through for one hour and subsequently heat-treated by blowing hot air through the thus fluidized bed of material. Another similar sample was treated in exactly the same way, except that instead of blowing air through the fluidized bed to give good heat transfer and to mix the powder, argon was used for this purpose. The total heating time, including about 40 minutes to raise the temperature from room temperature to about 232° C., was about 60 minutes in each experiment and except for the gas used to fluidize the bed all conditions were the same. The pH of one percent solution of the spent sulfite liquor prior to chlorination was 4.7. After chlorination it decreased to below 4 and upon heating for 60 minutes it increased to about 6.4.

The product obtained by the use of argon was substantially lighter in color than the product obtained when air was used. Both samples were tested as thinners for driling mud of the lime mud type with results as shown in Table 1.

TABLE 1.—LIME MUD RESULTS

| | | | Test Results on Hot Rolled Mud | | | |
|---|---|---|---|---|---|---|
| Sample No. | Fluidizing Gas | Lbs./Bbl. Additive | Initial Gel | Yield | 10 Min. Gel | Water Loss |
| 1 | Air | 4 | 1.0 | 2.0 | 3.5 | 14.8 |
|   |     | 6 | 1.0 | 1.0 | 1.5 | 14.4 |
| 2 | Argon | 4 | 1.0 | 5.5 | 36.0 | 12.8 |
|   |       | 6 | 0.5 | 1.0 | 1.5 | 14.8 |
| 3 | None | 4 | 13.0 | 24.0 | 130.0 | 17.9 |
|   | (Untreated SSL Solids) | 6 | 7.0 | 4.5 | 30.0 | 14.4 |

In the above table the API test methods were used as set forth in column 26 and 27 of the U.S. Patent No. 2,935,473, the entire disclosure of which is hereby incorporated herein by reference. Similar results may be obtained when bromine is used in place of chlorine for halogenating the SSL solids.

EXAMPLE II

In the following example the efficacy of the material treated in accordance with the invention for the dispersion of plaster of Paris is shown.

SSL solids as in Example I were given the treatment set forth in that example. The first batch was treated for 60 minutes at 232° C., while the second batch was treated for 10 minutes at 270° C. The treated samples were tested for their ability to liquify slurries of plaster of Paris in water. The method of test was modeled after that given by Lambe et al., Bulletin of American Ceramics Society, vol. 3, page 272 ff., September 15, 1954. To 30 cc. of distilled water there was added one-half gram of the lignosulfonate product, treated as described and the additive was disolved by stirring. Then 50 grams of commercial plaster of Paris was sifted into the liquid, stirred gently with a spatula for 10 seconds, and allowed to stand for one minute. The slurry was then stirred for 15 seconds and poured from a height of four inches, measured from the lip of the container onto a glass plate. The diameter of the resulting patty was measured. To provide a blank for comparison a duplicate test was performed using untreated lignosulfonate. The results obtained are given in Table 2 which follows.

TABLE 2

| Additive | Diameter, inches | Increase in area over blank (calc.) |
| --- | --- | --- |
| SSL, untreated (blank) | 3.5 | |
| SSL, chlorinated, heated 60 min. at 232° C | 3.8 | 18% |
| SSL, chlorinated, heated 10 min. at 270° C | 3.9 | 24% |

EXAMPLE III

To illustrate the increase in the pH obtained by dry heating an oxidized sulfonated lignin-containing material and the variation of the reducing substance obtained in the product as effected by the dry heating, a series of chlorinated spent sulfite liquor samples were heated for various times and then analyzed for reducing substances and the pH of a one percent solution was determined.

A calcium base fermented spent sulfite liquor was used which had 10.5 percent reducing substance calculated as glucose and a one percent solution had a pH of 4.7. The material was chlorinated in a fluid bed for 60 minutes by passing a gas mixture comprising 10% chlorine and 90% air through the bed. After chlorination, the bed was purged with air and the products were then heated to 232° C. Samples were drawn out after the product had been heated for predetermined times and the reducing substances were determined according to the modified Schoorl procedure described in "Svensk Papperstidning," 47, 514 (1944). The pH of a one percent solution of the product was also determined. The results obtained are shown in the table below.

| | Reducing substances as Glucose, percent | pH 1% Solution |
| --- | --- | --- |
| Total Heating Time, minutes: | | |
| 40 | 7.6 | 5.6 |
| 50 | 7.1 | 5.2 |
| 60 | 7.9 | 6.4 |
| 65 | 10.2 | 6.5 |
| 70 | 11.1 | 7.2 |

EXAMPLE IV

To illustrate the treatment of the sulfonated lignin-containing material with a non-gaseous oxidizing agent, a concentrated spent sulfite liquor was oxidized in an aqueous medium with nitric acid.

A 1200 g. sample of a concentrated, steam-stripped fermented spent liquor from the calcium bisulfite pulping of western softwoods containing 300 g. solids was used. The spent sulfite liquor was heated to 90° C. and treated with a dilute nitric acid solution containing 15 g. of $HNO_3$. After adding the acid, the product was heated at 90° C. for 3.5 hours after which it was boiled for 3 minutes and then adjusted to pH 4.5 by adding a lime slurry. The product was filtered and spray-dried.

Ffity grams of the spray-dried powder were distributed on enamelware trays and heated in a forced-draft oven at 235° C. for 30 minutes. Before heating, the pH of an aqueous solution of the product was 5.0. After heating, the solution of the product had a pH of 6.4.

The product was compared as an additive in a lime base drilling mud with the original spent sulfite liquor and with a nitric acid oxidized unheated spent sulfite liquor. The results are shown below.

HOT ROLLED LIME MUD TEST RESULTS, 6 LBS./BBL. OF ADDITIVE

| Spent Sulfite Liquor Additive | Initial Gel | Yield | 10 Min. Gel | Water Loss |
| --- | --- | --- | --- | --- |
| Untreated | 3.0 | 26.0 | 20.0 | 16.6 |
| $HNO_3$ treated, unheated | 1.0 | 2.0 | 5.0 | 17.1 |
| Dry Heated, $HNO_3$ treated product | 1.5 | 1.0 | 1.0 | 16.0 |

What is claimed is:

1. A composition comprising a water-soluble sulfonated lignin-containing material, said material being a sulfonated lignin-containing material oxidized with an oxidizing agent selected from the group consisting of a halogen having an atomic number in the range of 17 to 35, nitric acid, hydrogen peroxide, and persulfates, and subsequently heated in a dry form at a temperature of at least 200° C. without charring, said sulfonated lignin-containing material being oxidized with the oxidizing agent until the oxidizing agent has reacted with the sulfonated lignin-containing material in an amount of from 0.2 to 5 weight percent of the sulfonated lignin-containing material.

2. A composition according to claim 1 wherein the oxidizing agent is a halogen selected from the group consisting of chlorine and bromine.

3. A composition according to claim 2 wherein the sulfonated lignin-containing material is spent sulfite liquor.

4. A composition comprising a water-soluble sulfonated lignin-containing material, said material being a sulfonated lignin-containing material halogenated with a halogen selected from the group consisting of chlorine and bromine until the halogen has combined with the sulfonated lignin-containing material in an amount of from 0.2 to 5 weight percent of the sulfonated lignin-containing material, and said halogenated sulfonated lignin-containing material being subsequently heated without charring in a dry form at a temperature in the range of 200° C. to 330° C.

5. A composition according to claim 4 wherein said material is chlorinated prior to being heated.

6. A composition according to claim 4 wherein said material is brominated prior to being heated.

7. A composition according to claim 4 wherein said sulfonated lignin-containing material is heated until not more than 10% of said product becomes insoluble in water.

8. A composition according to claim 4 wherein the sulfonated lignin-containing material is heated for a period of time until a change in the pH of the material, measured as the pH of a one percent aqueous solution of said material, is obtained.

9. A composition according to claim 8 wherein the said lignosulfonate-containing material is heated at a temperature in the range of 230° C. to 270° C.

10. A process for modifying a sulfonated lignin-containing material which comprises contacting said material with an oxidizing agent selected from the group consisting of a halogen having an atomic number in the range of 17 to 35, nitric acid, hydrogen peroxide, and persulfates, until the oxidizing agent has reacted with the sulfonated lignin-containing material in an amount of from 0.2 to 5 weight percent of the sulfonated lignin-containing material, and heating the so-treated material in a dry form at a temperature of at least 200° C. without charring.

11. A process according to claim 10 wherein the sulfonated lignin-containing material is a spent sulfite liquor and is heated at a temperature in the range of 200° C. to 330° C.

12. A process according to claim 11 wherein the oxidizing agent is nitric acid.

13. A process of modifying a lignosulfonate-containing material which comprises contacting said material in a dry form with a gaseous halogen selected from the group consisting of chlorine and bromine until the halogen has combined with the sulfonated lignin-containing material in an amount of from 0.2 to 5 weight percent of the sulfonated lignin-containing material, and heating without charring the so-treated material in a dry form to a temperature in the range of 200° C. to 330° C. for a period of time until a change in the pH of the material is obtained, measured as a pH of one percent aqueous solution of said material.

14. A process according to claim 13 wherein the halogen is bromine.

15. A process according to claim 13 wherein the halogen is gaseous chlorine.

16. A process according to claim 15 wherein the sulfonated lignin-containing material is a spent sulfite liquor.

17. A process according to claim 16 wherein the treated material is heated for a period of time such that from 5 to 10% of the resulting material is insoluble in water.

18. A process according to claim 16 wherein the lignosulfonate-containing material is contacted with chlorine gas for a period of time beyond which substantially no further chlorine is taken up by said material.

19. The process of modifying a calcium base spent sulfite liquor comprising the steps of contacting said material in comminuted form with gaseous chlorine until the content of the chlorine taken up is from 0.2 to 5 weight percent of material, and thereafter bringing the so-treated material to a temperature in the range of 200° C. to 330° C. for from about one minute to a time less than to char the material.

20. A process according to claim 19 wherein the material is heated at a temperature in the range of 230° C. to 270° C. for a period of time from one-fourth to one hour.

References Cited
UNITED STATES PATENTS
3,326,980  6/1967  Goheen _____ 260—124. XR

FOREIGN PATENTS
389,470  2/1924  Germany.

CHARLES B. PARKER, Primary Examiner

D. R. PHILLIPS, Assistant Examiner

U.S. Cl. X.R.

106—90, 111; 252—8.5, 353